(12) United States Patent
Chapman

(10) Patent No.: US 7,437,347 B1
(45) Date of Patent: Oct. 14, 2008

(54) ROW REDISTRIBUTION IN A RELATIONAL DATABASE MANAGEMENT SYSTEM

(75) Inventor: James Blair Chapman, Glendale, CA (US)

(73) Assignee: Teradata US, Inc., Miamisburg, OH (US)

( * ) Notice: Subject to any disclaimer, the term of this patent is extended or adjusted under 35 U.S.C. 154(b) by 635 days.

(21) Appl. No.: 10/735,026

(22) Filed: Dec. 12, 2003

(51) Int. Cl.
*G06F 7/00* (2006.01)

(52) U.S. Cl. .................. 707/2; 707/1; 707/10; 707/100

(58) Field of Classification Search ...................... 707/1, 707/2, 3, 10, 100
See application file for complete search history.

(56) References Cited

U.S. PATENT DOCUMENTS 5,666,525 A * 9/1997 Ross ............................ 707/2
5,819,083 A * 10/1998 Chen et al. .................... 707/10

OTHER PUBLICATIONS

Shatdal, A., Naughton, J. F., "Adaptive Parallel Aggregation Algorithms", 1995, SIGMOD '95, pp. 104-114.*
Leverenz et al., "Oracle8i Concepts", Feb. 1999, <http://www.csee.umbc.edu/help/oracle8/server.815/a67781/toc.htm>, Release 8.1.5, pp. 1-85.*

* cited by examiner

*Primary Examiner*—Hung Q Pham
(74) *Attorney, Agent, or Firm*—Howard Speight

(57) ABSTRACT

A computer program and system for redistributing data in a relational data base management system includes storing one or more rows of a database table in an allocated buffer associated with a program. The program is associated with a transmitting processing module and is capable of managing a redistribution of one or more rows associated with one or more database tables. The method includes comparing the allocated buffer to a portion of the buffer to be occupied by the one or more rows. If the allocated buffer is larger than the portion of the buffer to be occupied by the one or more rows, then the method includes communicating a message to one or more destination processing modules, the message comprising at least some of the one or more rows stored in the allocated buffer. Otherwise, the method includes executing a many-rows method to redistribute the one or more rows.

15 Claims, 5 Drawing Sheets

ROW REDISTRIBUTION IN A RELATIONAL DATABASE MANAGEMENT SYSTEM

BACKGROUND

Data organization is typically important in relational database systems that deal with complex queries and other commands involving large volumes of data. In relational databases using SQL, relationships are used to breakdown tables into simpler structures for storage in one or more data-storage devices. As a result, related information may be stored in multiple tables and distributed multiple data-storage devices. In most cases, before a relational database system can process a query, the relational database system must redistribute the information so that it may be processed and/or correlated according to the received query.

SUMMARY

In one aspect, the invention features a method for redistributing data in a relational data base management system. The method includes invoking a program on one or more of a plurality of transmitting modules. The program is capable of managing a redistribution of one or more rows associated with one or more database tables. If the program was invoked on a single transmitting module, then the method includes executing a few-rows redistribution method to redistribute the one or more rows. Otherwise the method includes executing a many-rows redistribution method to redistribute the one or more rows.

In another aspect, the invention features a method for redistributing data in a relational data base management system. The method includes storing one or more rows of a database table in an allocated buffer associated with a program. The program is associated with a transmitting processing module and is capable of managing a redistribution of one or more rows associated with one or more database tables. The method also includes comparing the allocated buffer to a portion of the buffer to be occupied by the one or more rows. If the allocated buffer is larger than the portion of the buffer to be occupied by the one or more rows, then the method includes communicating a message to one or more destination processing modules. The message includes at least some of the one or more rows being stored in the allocated buffer. Otherwise, the method includes executing a many-rows method to redistribute the one or more rows.

Implementations of the invention may include one or more of the following. Various implementations can reduce the amount of signaling between processing modules during a redistribution of data. Other implementations can improve the performance of a database system during a row redistribution procedure. Some implementations can allow the database system to dynamically choose between a few-rows redistribution method and a many-rows redistribution method. Further implementations can optimize a row-redistribution that involves only a few-rows of data.

DETAILED DESCRIPTION

A row redistribution technique operates by communicating one or more rows of data from its permanent storage location to another location within a database system so that the database system can process a query, such as a structured query language (SQL) query. As a result, the database system co-locates the data at a desired location for processing and/or correlating the rows of data necessary to fulfill the query. For example, in a join operation, where rows of two of more tables are to be correlated according to keys associated with certain columns in each table, the database system communicates at least some of the potentially matching rows to a common processing module or storage facility for correlation with other data.

Figure 1:
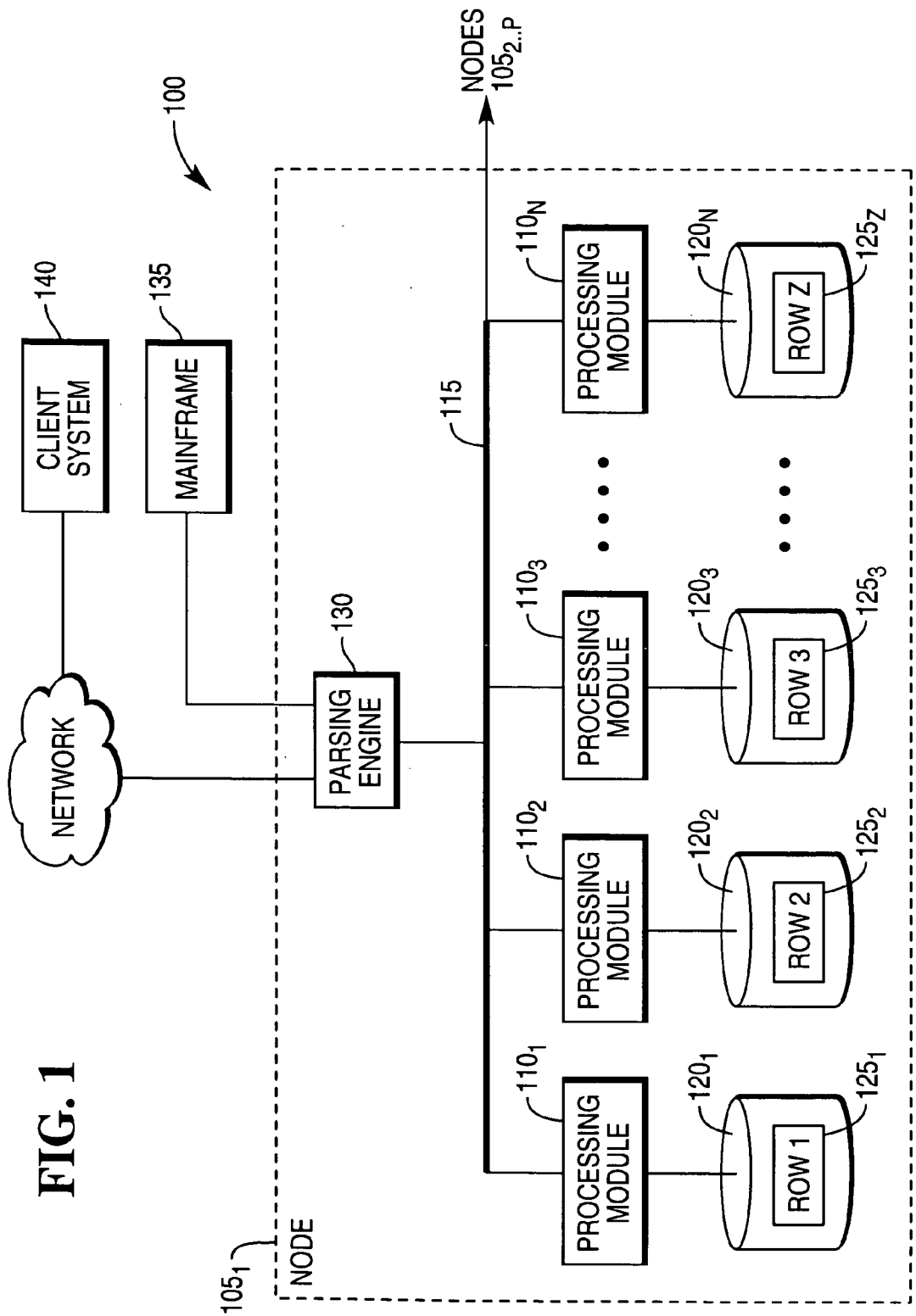
FIG. 1 is a block diagram of a node of a parallel processing database system.

The row redistribution technique disclosed herein has particular application, but is not limited, to large databases that might contain many millions or billions of records managed by a database system ("DBS") 100, such as a Teradata Active Data Warehousing System available from NCR Corporation. FIG. 1 shows a sample architecture for one node 105$_1$ of the DBS 100. The DBS node 105$_1$ includes one or more processing modules 110$_{1 \ldots N}$, connected by a network 115, that manage the storage and retrieval of data in data-storage facilities 120$_{1 \ldots N}$. Each of the processing modules 110$_{1 \ldots N}$ may be one or more physical processors or each may be a virtual processor, with one or more virtual processors running on one or more physical processors.

For the case in which one or more virtual processors are running on a single physical processor, the single physical processor swaps between the set of N virtual processors.

For the case in which N virtual processors are running on an M-processor node, the node's operating system schedules the N virtual processors to run on its set of M physical processors. If there are 4 virtual processors and 4 physical processors, then typically each virtual processor would run on its own physical processor. If there are 8 virtual processors and 4 physical processors, the operating system would schedule the 8 virtual processors against the 4 physical processors, in which case swapping of the virtual processors would occur.

Each of the processing modules 110$_{1 \ldots N}$ manages a portion of a database that is stored in a corresponding one of the data-storage facilities 120$_{1 \ldots N}$. Each of the data-storage facilities 120$_{1 \ldots N}$ includes one or more disk drives. The DBS 100 may include multiple nodes 105$_{2 \ldots P}$ in addition to the illustrated node 105$_1$, connected by extending the network 115.

The system stores data in one or more tables in the data-storage facilities 120$_{1 \ldots N}$. The rows 125$_{1 \ldots Z}$ of the tables are stored across multiple data-storage facilities 120$_{1 \ldots N}$ to ensure that the system workload is distributed evenly across the processing modules 110$_{1 \ldots N}$. A parsing engine 130 organizes the storage of data and the distribution of table rows 125$_{1 \ldots Z}$ among the processing modules 110$_{1 \ldots N}$. The parsing engine 130 also coordinates the retrieval of data from the data-storage facilities 120$_{1 \ldots N}$ in response to queries received from a user at a mainframe 135 or a client computer 140. The DBS 100 usually receives queries and commands to build tables in a standard format, such as SQL.

In one implementation, the rows 125$_{1 \ldots Z}$ are distributed across the data-storage facilities 120$_{1 \ldots N}$ by the parsing engine 130 in accordance with their primary index. The primary index defines the columns of the rows that are used for calculating a hash value. The function that produces the hash value from the keys in the columns specified by the primary index is called the hash function. Some portion, possibly the entirety, of the hash value is designated a "hash bucket." The hash buckets are assigned to data-storage facilities $120_{1\ldots N}$ and associated processing modules $110_{1\ldots N}$ by a hash bucket map. The characteristics of the columns chosen for the primary index determine how evenly the rows are distributed.

Figure 2:
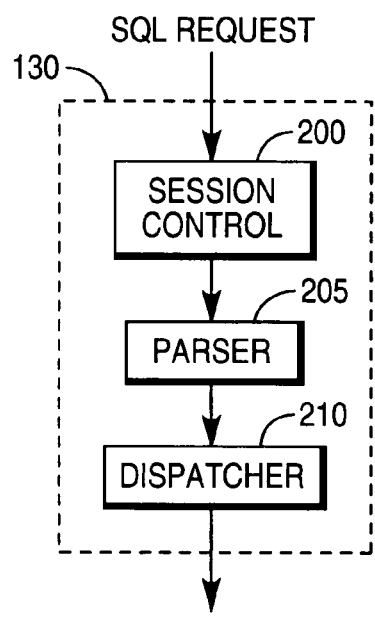
FIG. 2 is one example of a block diagram of a parsing engine.

In one example system, the parsing engine 130 is made up of three components: a session control 200, a parser 205, and a dispatcher 210, as shown in FIG. 2. The session control 200 provides the logon and logoff function. It accepts a request for authorization to access the database, verifies it, and then either allows or disallows the access.

Figure 3:
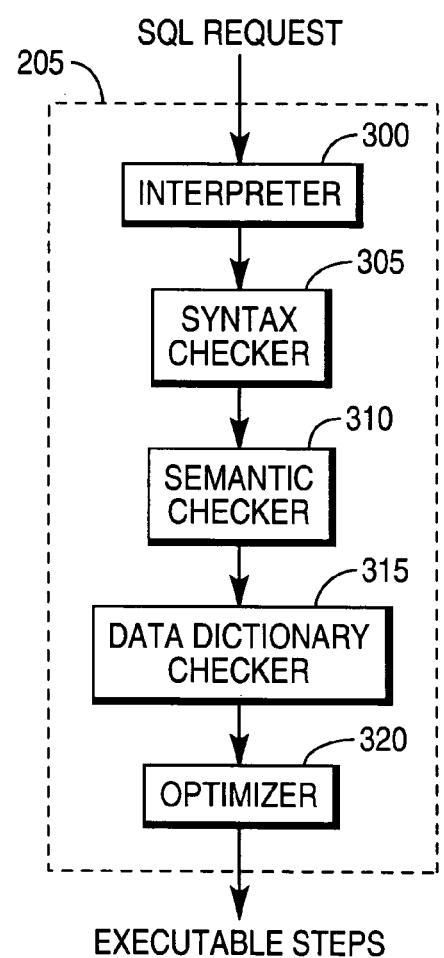
FIG. 3 is a flowchart of a parser.

Once the session control 200 allows a session to begin, a user may submit a SQL request, which is routed to the parser 205. As illustrated in FIG. 3, the parser 205 interprets the SQL request (block 300), checks it for proper SQL syntax (block 305), evaluates it semantically (block 310), and consults a data dictionary to ensure that all of the objects specified in the SQL request actually exist and that the user has the authority to perform the request (block 315). Finally, the parser 205 runs an optimizer (block 320), which develops the least expensive plan to perform the request.

In one example system, DBS 100 of FIG. 1 determines which data-storage facilities $120_{1\ldots N}$ and associated processing modules $110_{1\ldots N}$ contain the desired rows $125_{1\ldots Z}$ of data necessary to fulfill a query received by DBS 100. In most examples, the database system does not know the number of rows to be redistributed before the query can be processed. In one implementation, DBS 100 can determine that data-storage facilities $120_N$ and $120_1$ have rows $125_Z$ and $125_1$ that contain data necessary to fulfill at least a portion of a query being processed by processing module $110_2$. In other implementations, DBS 100 determines that each data-storage facility $120_{1\ldots N}$ of DBS nodes $105_{1\ldots P}$ has a desired row 125 of data necessary to fulfill at least a portion of a query being processed by a plurality of processing modules $110_{1\ldots N}$. In yet other implementations, DBS 100 can determine that a subset of all data-storage facilities $120_{1\ldots N}$ of DBS nodes $105_{1\ldots P}$ have at least one desired row 125 of data necessary to fulfill at least a portion of a query being processed by a plurality of processing modules $110_{1\ldots N}$. In various examples, DBS 100 can determine the location of the desired rows $125_{1\ldots Z}$ of data based at least in part on a primary or secondary key assigned to the particular data-storage facility $120_{1\ldots N}$, the particular processing modules $110_{1\ldots N}$, and/or the particular row $125_{1\ldots Z}$. In one implementation, DBS 100 determines the location of the desired rows $125_{1\ldots Z}$ of data based at least in part on the hash buckets assigned to the particular data-storage facilities $120_{1\ldots N}$ and associated processing modules $110_{1\ldots N}$.

In one particular example system, DBS 100 stores rows 125 associated with an orders table and a customers table across a plurality of data-storage facilities $120_{1\ldots N}$ of DBS nodes $105_{1\ldots P}$. In various examples, DBS 100 stores rows 125 associated with the order table and the customers table evenly across each of the data-storage facilities $120_{1\ldots N}$ of DBS nodes $105_{1\ldots P}$. The orders table comprises two columns, the first column having one or more orders numbers and the second column having the customer number associated with each order. The customers table comprises two columns, the first column having one or more customer numbers and the second column having the billing address associated with the customer number. In this example, the order number of the orders table and the customer number of the customer table comprise the primary keys associated with each table. The customer number of the orders table and the billing address comprise secondary keys associated with each table.

In one particular example system, DBS 100 receives a query to generate one or more invoices associated with one or more particular customers. In this example, dispatcher 210 of FIG. 2 determines which data-storage facilities $120_{1\ldots N}$ of DBS nodes $105_{1\ldots P}$ and associated processing modules $110_{1\ldots N}$ contain the desired rows 125 of data necessary to fulfill the query. For example, DBS 100 can determine that data-storage facilities $120_1$ and $120_2$ have rows $125_1$ and $125_2$ that contain the desired order numbers necessary to fulfill at least a portion of a query being processed by processing module $110_N$. In this example, DBS 100 determines the location of the desired rows $125_1$ and $125_2$ of data based at least in part on the secondary key assigned to the particular data. In other example systems, DBS 100 determines the location of the desired rows $125_{1\ldots Z}$ of data based at least in part on the primary keys assigned to the particular data-storage facilities $120_{1\ldots N}$ and associated processing modules $110_{1\ldots N}$.

Figure 4:
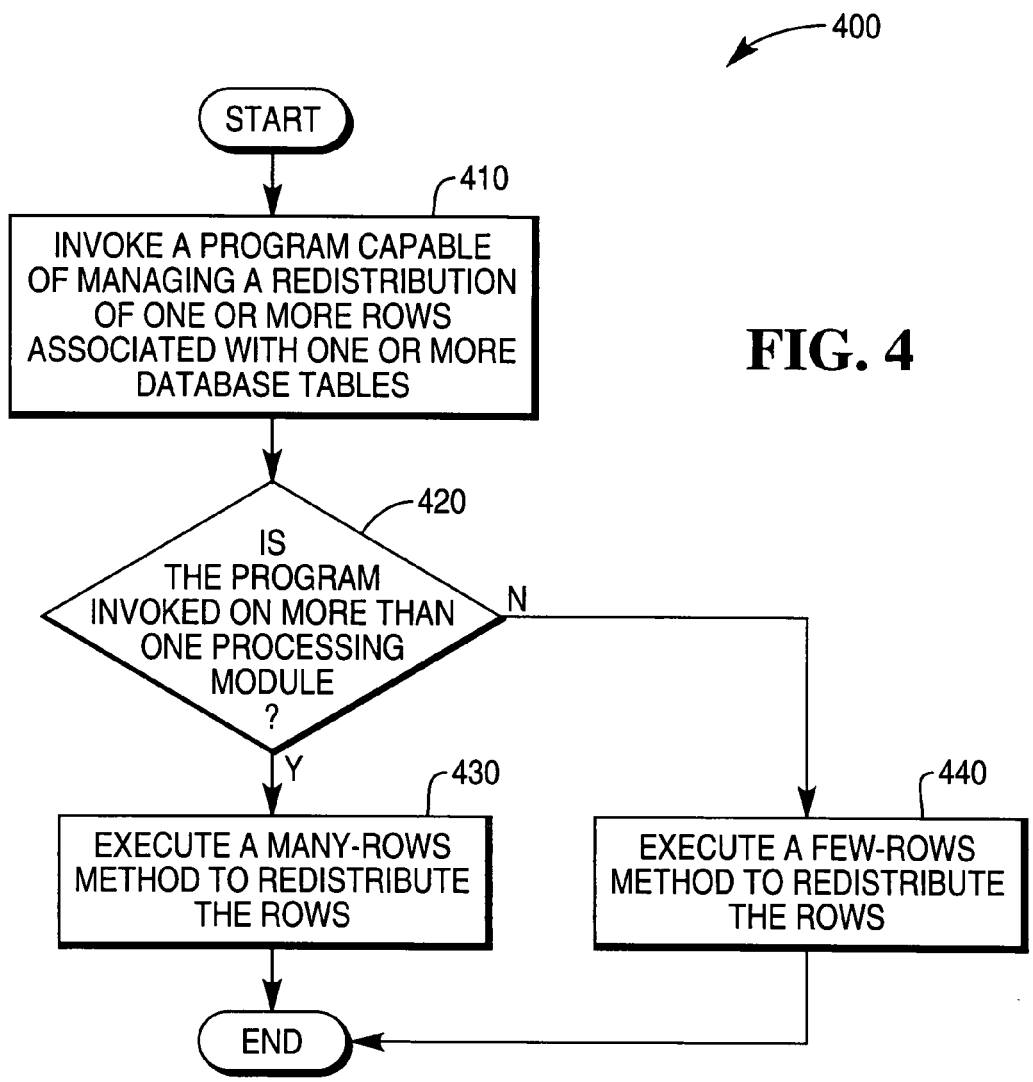
FIG. 4 is one example of a flowchart of a row redistribution method capable of managing a row redistribution procedure.

In one particular example system, DBS 100 redistributes one or more of rows 125 of data from data-storage facilities 120 to one or more other data-storage facilities 120 or to one or more other processing modules 110 by implementing a row redistribution method 400, shown in FIG. 4. For example, DBS 100 can redistribute rows $125_Z$ and $125_1$ from data-storage facilities $120_N$ and $120_1$ to data-storage facility $125_2$ or processing module $110_2$ to fulfill at least a portion of a query being processed by processing module $110_2$. In one particular example system, method 400 manages a row redistribution of one or more rows $125_{1\ldots Z}$ stored across each of data-storage facilities $120_{1\ldots N}$ within DBS node $105_1$. In other example systems, method 400 can manage a row redistribution of a plurality of rows 125 stored within a plurality of data-storage facilities $120_{1\ldots N}$ across a plurality of DBS nodes $105_{1\ldots P}$.

In one particular implementation, DBS 100 receives a query to generate one or more invoices associated with one or more customers. In this example, processing modules $110_{1\ldots N}$ redistribute the desired rows $125_{1\ldots Z}$ to one or more other data-storage facilities 120 or processing modules 110 to fulfill the query. For example, processing modules $110_1$ and $110_2$ can redistribute rows $125_1$ and $125_2$ that contain the desired orders numbers to processing module $110_N$ to fulfill at least a portion of a query being processed by processing module $110_N$.

In the example shown in FIG. 4, method 400 begins at block 410 by invoking a redistribution program at each of the processing modules 110 that have access to one or more of the desired rows 125 of data. In one particular implementation, the redistribution program is invoked on each of processing modules $110_{1\ldots N}$ having access to one or more of the rows $125_{1\ldots Z}$ of data that are necessary to fulfill at least a portion of a query being processed by others of processing modules $110_{1\ldots N}$. For example, where rows $125_Z$ and $125_1$ are necessary to fulfill at least a portion of a query being processed by processing module $110_2$, the redistribution program is invoked on each of processing modules $110_N$ and $110_1$. In other implementations, method 400 can invoke the row redistribution program on each of a plurality of processing modules $110_{1\ldots N}$ across a plurality of DBS nodes $105_{1\ldots P}$.

In this example system, each of processing modules $110_{1\ldots N}$ of DBS nodes $105_{1\ldots P}$ has access to the redistribution program. In various example systems, the redistribution program can be stored on data-storage facility $120_{1\ldots N}$ associated with processing module $110_{1\ldots N}$. In other example systems, the redistribution program can be stored in a memory associated with each processing module $110_{1\ldots N}$. In some examples, one or more copies of the redistribution program can be stored on one or more common storage devices accessible to a plurality of processing modules $110_{1\ldots N}$. The redistribution program can comprise any hardware, software, and/or firmware capable of managing the redistribution of one or more rows $125_{1\ldots Z}$ of data to a desired location within DBS 100. As an example, the redistribution program could represent one or more SQL commands that manage the redistribution of rows $125_{1\ldots Z}$ within DBS 100.

Method 400 determines the number of processing modules $110_{1\ldots N}$ on which the redistribution program was invoked at block 420. In one implementation, method 400 determines that the redistribution program is invoked on more than one processing module $110_{1\ldots N}$ associated with one or more DBS nodes 105...p. For example, where rows $125_Z$ and $125_1$ are necessary to fulfill at least a portion of a query being processed by processing module $110_2$, method 400 determines that the redistribution program is invoked at least on processing modules $110_N$ and $110_1$. In other implementations, method 400 determines that the redistribution program was invoked on only one processing element $110_{1\ldots N}$. For example, where one or more rows, represented by row $125_3$, are necessary to fulfill at least a portion of a query being processed by processing module $110_1$, method 400 determines that the redistribution program is invoked only on processing module $110_3$.

In this particular example, method 400 executes a "many-rows" redistribution method at block 430 if the redistribution program was invoked on more than one processing module $110_{1\ldots N}$. In one particular example system, DBS 100 implements a many-rows redistribution method to redistribute data stored in data-storage facilities $120_{1\ldots N}$ prior to processing and/or correlating the data. The term "many-rows" refers to a method of redistributing rows of data that invokes the redistribution program on many processing modules and requires the redistribution of many rows of data. The number of processing modules necessary to implement the many-rows method depends at least in part on the size of the database system in which the many-rows method is implemented and the number of rows to be redistributed. Implementing the many-rows method can efficiently use a database system's resources when the number of processing modules invoke is large, relative to the size of the system, and the number of redistributed rows is large. For example, in a database system that includes ten (10) processing modules $110_{1\ldots N}$ and invokes the redistribution program on two (2) of the processing modules $110_{1\ldots N}$, then the many-rows method may provide the most efficient use of the database systems resources.

Figure 5:
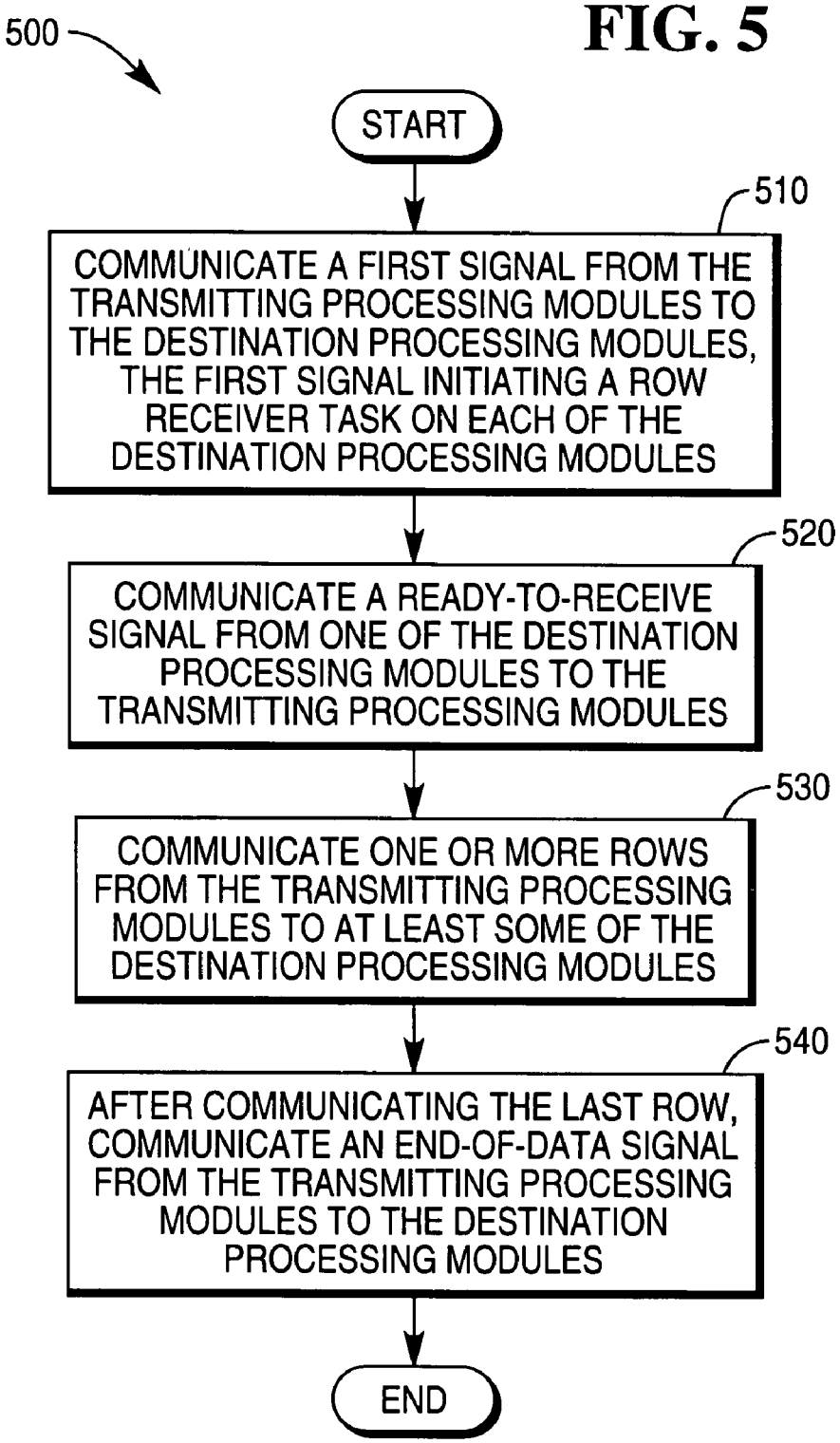
FIG. 5 is one example of a flowchart of a "many-rows" method of row redistribution.

FIG. 5 is one example of a "many-rows" method 500 for redistributing one or more rows $125_{1\ldots Z}$ of data stored in data-storage facilities $120_{1\ldots N}$. Method 500 begins at block 510 by communicating a start row receiver task signal from each of transmitting processing modules $110_{1\ldots N}$ to one or more destination processing modules $110_{1\ldots N}$. In various example systems, each of processing modules $110_{1\ldots N}$ associated with each of DBS nodes $105_{1\ldots P}$ includes a transmitting module and a destination module. In other example systems, a subset of processing modules $110_{1\ldots N}$ associated with some of DBS nodes $105_{1\ldots P}$ include transmitting processing modules and/or destination processing modules. The row receiver task prepares destination processing modules $110_{1\ldots N}$ for receiving one or more redistributed rows $125_{1\ldots Z}$. As used herein the terms "transmitting processing modules" and "transmitting module" refer to those processing modules $110_{1\ldots N}$ having access to one or more of the desired rows $125_{1\ldots Z}$ of data that are necessary to fulfill at least a portion of a query being processed by others of processing modules $110_{1\ldots N}$. The terms "destination processing module" and "destination module" refer to those processing modules $110_{1\ldots N}$ to which the desired rows $125_{1\ldots Z}$ of data are being communicated to fulfill at least a portion of a query being processed by that processing modules $110_{1\ldots N}$.

In one particular example system, processing module $110_N$ receives at least a portion of a query to generate one or more invoices associated with one or more particular customers. In that example, DBS 100 determines that processing modules $110_1$ and $110_2$ have access to rows $125_1$ and $125_2$ that contain at least some of the necessary data to fulfill the portion of the query being processed on processing module $110_N$. That is, processing modules $110_1$ and $110_2$ include transmitting processing modules that have access to data and processing module $110_N$ includes a destination processing module that needs the data to fulfill at least a portion of the query being processed.

In the example shown in FIG. 5, the start row receiver task signal initiates a row receiver task on each of the destination processing modules $110_{1\ldots N}$. In some situations, a row receiver task may be initiated on each of processing modules $110_{1\ldots N}$ associated with each of DBS nodes $105_{1\ldots P}$ substantially simultaneously. In other situations, a row receiver task may initiated on each of a subset of processing modules $110_{1\ldots N}$ associated with some of DBS nodes $105_{1\ldots P}$ substantially simultaneously. The receiver tasks associated with each of the destination modules $110_{1\ldots N}$ perform a signaling operation among each of the destination modules $110_{1\ldots N}$ to determine when each destination module $110_{1\ldots N}$ is ready to receive one or more rows $125_{1\ldots Z}$ of data. In some examples, this signaling operation can include a synchronization of all the destination modules $110_{1\ldots N}$. In some situations, the signaling operations between destination processing modules $110_{1\ldots N}$ can introduce a latency within DBS 100.

After destination modules $110_{1\ldots N}$ determine that each destination module $110_{1\ldots N}$ is ready to receive one or more rows $125_{1\ldots Z}$ of data, one of the destination processing modules $110_{1\ldots N}$ communicates a ready-to-receive signal to each of the transmitting processing modules $110_{1\ldots N}$ at block 520. One or more rows $125_{1\ldots Z}$ are communicated from transmitting processing modules $110_{1\ldots N}$ to at least some of the destination processing modules $110_{1\ldots N}$ at block 530. In some situations, each of processing modules $110_{1\ldots N}$ associated with each of DBS nodes $105_{1\ldots P}$ communicates one or more rows $125_{1\ldots Z}$ of data to at least one other processing module $110_{1\ldots N}$ of DBS 100. In other situations, each of a subset of processing modules $110_{1\ldots N}$ associated with some of DBS nodes $105_{1\ldots P}$ communicates one or more rows $125_{1\ldots Z}$ of data at least one other processing module $110_{1\ldots N}$ of DBS 100.

In one particular example, each of processing modules $110_N$ and $110_3$ receives at least a portion of a query to generate one or more invoices associated with one or more particular customers. In that example, DBS 100 determines that each of processing modules $110_1$ and $110_2$ have access to a plurality of rows, represented by rows $125_1$ and $125_2$, that contain at least some of the data necessary to fulfill the portion of the query being processed on processing modules $110_N$ and $110_3$. In that case, processing modules $110_1$ and $110_2$ each communicate one or more of the plurality rows 125 of data to each of destination processing modules $110_N$ and $110_3$. After communicating the last row 125, method 500 communicates an end-of-data signal from transmitting processing modules $110_{1...N}$ to destination processing modules $110_{1...N}$.

In this particular example system, method 400 of FIG. 4 executes a "few-rows" method of redistributing rows at block 440 if the redistribution program was invoked on single processing module $110_{1...N}$ within DBS 100. In one particular example system, DBS 100 implements a few-rows method to redistribute data stored in data-storage facilities $120_{1...N}$ prior to processing and/or correlating the data. The term "few-rows" refers to a method of redistributing rows of data that invokes the redistribution program on only one or a few processing modules and requires the redistribution of a few rows of data.

The number of rows of data capable of being redistributed by the few-rows method depends at least in part on the size of the database system in which the few-rows method is implemented. In various examples, the few-rows method can be implemented to redistribute one (1) row, two (2) rows, ten (10) rows, or more. Implementing the few-rows method can efficiently use a database system's resources when the number of processing modules invoked is small, relative to the size of the system, and the number of redistributed rows is small. For example, if the redistribution program is invoked on one processing module $110_{1...N}$ and that processing module $110_{1...N}$ needs to redistribute three (3) rows, then the few-rows method may provide the most efficient use of the database system's resources.

Figure 6:
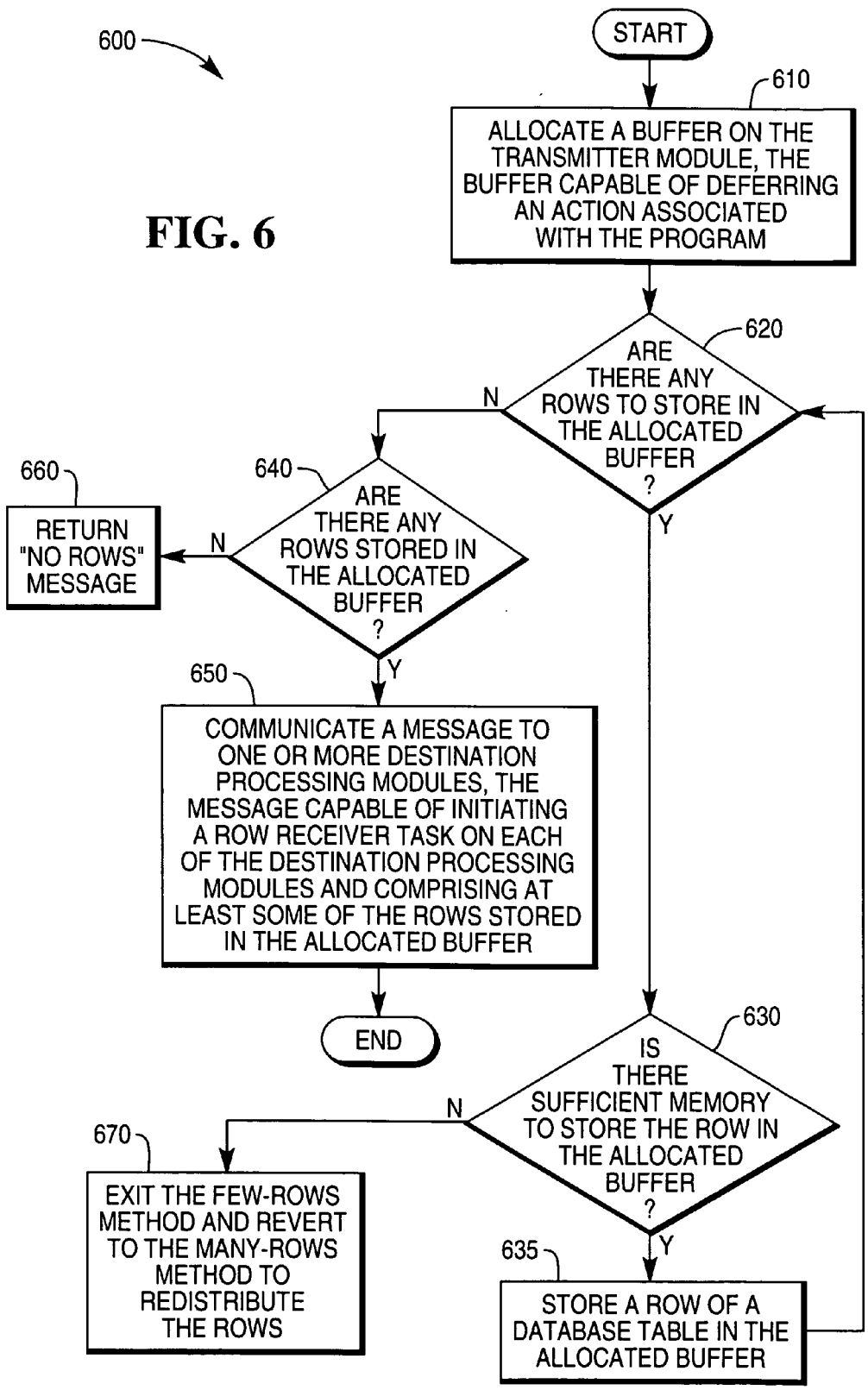
FIG. 6 is one example of a flowchart of a "few-rows" method of row redistribution.

FIG. 6 is one example of a "few-rows" method 600 for redistributing one or more rows $125_{1...Z}$ of data stored in data-storage facilities $120_{1...N}$. In this example, method 600 begins at block 610 by allocating a buffer associated with a redistribution program invoked on a transmitting processing module $110_{1...N}$. In various implementations, the buffer operates to defer an action associated with the redistribution program. In this particular implementation, allocating the buffer defers a set-up phase associated with the many-rows method. The set-up phase of the many-rows method includes at least blocks 510 and 520 of FIG. 5.

In one particular implementation, processing module $110_2$ receives at least a portion of a query to generate one or more invoices for a particular customer. In that example, DBS 100 determines that processing module $110_N$ has access to one or more desired rows, represented by row $125_Z$, that contain at least some of the necessary data to fulfill the portion of the query being processed on processing module $110_2$. That is, processing module $110_N$ includes a transmitting processing module and processing module $110_2$ includes a destination processing module. In that example, the redistribution program allocates a buffer within data-storage facility $120_N$. In other examples, the buffer may be allocated within the transmitting processing module $110_N$. In some examples, the buffer may be allocated within a memory device accessible to transmitting processing module $110_N$.

After the transmitting processing module $110_N$ allocates the buffer within data-storage facility $120_{1...N}$, transmitting processing module $110_N$, method 600 determines if there are any rows to store within the allocated buffer at step 620. In one example system, method 600 determines that transmitting processing element $110_N$ includes no-rows (i.e., zero-rows) to store within the allocated buffer. In that example system, method 600 determines that there are no-rows stored within the allocated portion of memory at step 640 and returns a "no-rows" message to a dispatcher, such as dispatcher 210 of FIG. 2, at step 660.

In this particular example system, method 600 determines that transmitting processing element $110_N$ has at least a first row of data $125_Z$ to store within the allocated buffer. After identifying at least one row to store within the allocated buffer, method 600 determines if there is sufficient memory within the allocated buffer to store the first row of data $125_Z$ at step 630. In one example system, method 600 determines that there is inadequate memory to store the first row of data $125_Z$ within the allocated buffer on transmitting processing element $110_N$. In that example system, method 600 exits the few-rows method and reverts to the many-rows redistribution method at block 670. In this particular example system, method 600 determines that there is sufficient memory to store the first row of data $125_Z$ within the allocated buffer on transmitting processing element $110_N$ and stores the first row of data $125_Z$ in the allocated buffer at block 635.

In this particular example system, method 600 iterates through steps 620, 630, and 635 until all the desired rows of data are stored in the allocated buffer. The transmitting processing module $110_N$ continues to invoke the redistribution program until all the desired rows are communicated to the allocated buffer or there is insufficient memory to store the desire rows. The storage capacity of the allocated buffer depends at least in part on the size of the database system in which method 600 is implemented. In most cases, the allocated buffer includes relatively small storage capacity that is capable storing only a few rows of data. In various examples, the allocated buffer is capable of storing no more than three (3) rows of data. In other examples, the allocated buffer is capable of storing no more than one (1) row of data. In some examples, the allocated buffer is capable of storing no more than ten (10) rows of data.

In this particular example system, method 600 communicates a message to one or more destination processing modules $110_{1...N}$ at block 650 if there are no more rows to store in the allocated buffer and if there are rows stored within the allocated buffer. The message communicated from the transmitting module $110_N$ initiates a row receiver task on each of the destination processing modules $110_{1...N}$. In one particular example, the message comprises at least some of the rows $125_{1...Z}$ stored in the allocated portion of the buffer. In other examples, the message comprises all of the one or more rows $125_{1...Z}$ stored in the allocated buffer. In one implementation, the message is communicated to and received by each of a plurality of destination modules $110_{1...N}$. In this particular example system, method 600 ends after all the necessary rows of data have been redistributed to the appropriate destination processing modules $110_{1...N}$.

In one particular example system, DBS 100 determines that processing module $110_N$ has access to one (1) row $125_Z$, that contains the necessary data to fulfill the portion of a query being processed on processing module $110_2$. In that example, transmitting processing module $110_N$ determines that there is sufficient memory within the allocated buffer to store row $125_Z$ within the allocated buffer. In this example, transmitting module $110_N$ allocates a buffer within data-storage facility $120_N$ and stores row $125_Z$ in the allocated buffer. In one example system, transmitting processing module $110_N$ communicates a message containing at least row $125_Z$ and an end-of-data signal to destination processing module $110_2$. Communicating the desired rows $125_{1...Z}$ of data and an end-of-data signal in one message can reduce the number of messages communicated between processing modules $110_{1...N}$ and improve the performance of DBS 100. In other examples, transmitting processing module $110_N$ communicates row $125_Z$ in a first message and then communicates end-of-data signal in a second message to destination processing module $110_2$. In some examples, transmitting processing module $110_N$ communicates only the desired row $125_Z$ of data to destination processing module $110_2$. In yet other examples, transmitting processing module $110_N$ communicates the desired rows of data, represented by row $125_Z$, to each of processing modules $110_{1...N}$ associated with DBS nodes $105_{1...P}$.

In other implementations, DBS 100 determines that processing module $110_N$ has access to three (3) rows $125_{Z1}$, $125_{Z2}$, and $125_{Z3}$ that contain the necessary data to fulfill the portion of a query being processed on processing modules $110_1$ and $110_2$. In that example, method 600 iterates through steps 620, 630, and 635 until rows $125_{Z1-Z3}$ are stored within the allocated buffer or until method 600 determines there is insufficient memory to store rows $125_{Z1-Z3}$. In this example, method 600 stores rows $125_{Z1-Z3}$ within the allocated buffer. In one example system, transmitting processing module $110_N$ communicates a message containing rows $125_{Z1-Z3}$ to each of destination processing module $110_1$ and $110_2$. Communicating all of rows $125_{Z1-Z3}$ stored in the allocated buffer in one message to each of destination processing module $110_1$ and $110_2$ can reduce the number of message communicated across DBS 100 and improve the performance of DBS 100. In other examples, transmitting processing module $110_N$ communicates rows $125_{Z1-Z2}$ in a first message to destination processing module $110_2$ and then communicates row $125_{Z3}$ in a second message to destination processing module $110_1$. In some example systems, transmitting processing module $110_N$ communicates a message containing rows $125_{Z1-3}$ and an end-of-data signal to each of destination processing module $110_1$ and $110_2$.

In this particular example, method 400 of FIG. 4 ends after all the necessary rows $125_{1...Z}$ of data have been redistributed to the appropriate processing module $110_{1...N}$. As a result of method 400, DBS 100 co-locates the desired rows $125_{1...Z}$ of data at the appropriate processing module $110_{1...N}$ to allow processing modules $110_{1...N}$ to fulfill at least a portion of a query received by DBS 100.

The text above described one or more specific embodiments of a broader invention. The invention also is carried out in a variety of alternative embodiments and thus is not limited to those described here. For example, while the invention has been described here in terms of a DBMS that uses a massively parallel processing (MPP) architecture, other types of database systems, including those that use a symmetric multiprocessing (SMP) architecture, are also useful in carrying out the invention. The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for redistributing data in a relational data base management system, comprising:
    allocating a buffer associated with one or more transmitting processing modules, the one or more transmitting processing modules having access to a program, the program capable of managing a redistribution of one or more rows associated with one or more database tables;
    if the allocated buffer is larger than the one or more rows:
    storing the one or more rows in the allocated buffer;
    communicating a message to one or more destination processing modules, the message comprising at least some of the one or more rows stored in the allocated buffer;
    otherwise:
    executing a many-rows method to redistribute the one or more rows, wherein the many-rows method comprises:
    communicating from the one or more transmitting processing modules a first signal to one or more processing modules within a relational database system, the first signal operable to initiate a row receiver task on each of the one or more processing modules;
    communicating from the one or more processing modules a ready-to-receive signal to the one or more transmitting processing modules;
    communicating from the one or more transmitting processing modules a second signal comprising the one or more rows;
    after communication of the last row of the one or more rows, communicating from the one or more transmitting processing modules an end-of-data signal to each of the one or more processing modules.

2. The method of claim 1, wherein the message comprises all of the one or more rows stored in the allocated buffer.

3. The method of claim 1, wherein the one or more transmitting processing modules comprises one of the one or more processing modules.

4. The method of claim 1, wherein the message is communicated to each of a plurality of destination processing elements.

5. The method of claim 1, wherein the allocated buffer is capable of storing no more than ten (10) rows.

6. The method of claim 1, further comprising invoking the program on a single transmitting processing module.

7. The method of claim 1, further comprising receiving at each of a plurality of destination processing elements a substantially similar set of the one or more rows stored in the allocated buffer.

8. The method of claim 1, further comprising determining a number of rows to store in the allocated buffer.

9. A computer-readable medium containing computer-executable code for instructing a computer to:
    allocate a buffer associated with one or more transmitting processing modules, the one or more transmitting processing modules having access to a program, the program capable of managing a redistribution of one or more rows associated with one or more database tables;
    if the allocated buffer is larger than the one or more rows:
    store the one or more rows in the allocated buffer;
    communicate a message to one or more destination processing modules, the message comprising at least some of the one or more rows stored in the allocated buffer;
    otherwise:
    execute a many-rows method to redistribute the one or more rows, wherein the many-rows method comprises:
    communicating from the one or more transmitting processing modules a first signal to one or more processing modules within a relational database system, the first signal operable to initiate a row receiver task on each of the one or more processing modules;
    communicating from the one or more processing modules a ready-to-receive signal to the one or more transmitting processing modules;
    communicating from the one or more transmitting processing modules a second signal comprising the one or more rows;
    after communication of the last row of the one or more rows, communicating from the one or more transmitting processing modules an end-of-data signal to each of the one or more processing modules.

10. The computer-readable medium of claim 9, wherein the one or more transmitting processing modules comprises one of the one or more processing modules.

11. The computer-readable medium of claim 9, wherein the message is communicated to each of a plurality of destination processing elements.

12. The computer-readable medium of claim 9, wherein the allocated buffer is capable of storing no more than ten (10) rows.

13. The computer-readable medium of claim 9, further comprising invoking the program on a single transmitting processing module.

14. The computer-readable medium of claim 9, further comprising determining a number of rows to store in the allocated buffer.

15. A database management system, comprising:
- a massively parallel processing system comprising:
  - one or more nodes;
  - a plurality of processors, each of the one or more nodes providing access to one or more processors; and
  - a plurality of virtual processes, each of the one or more processors providing access to at least one of the plurality of virtual processes;
  - a set of one or more database tables residing on the one or more nodes; and
  - one or more of the plurality of virtual processes that:
    - allocate a buffer associated with one or more transmitting processing modules, the one or more transmitting processing modules having access to a program, the program capable of managing a redistribution of one or more rows associated with one or more database tables;
    - if the allocated buffer is larger than the one or more rows:
    - store the one or more rows in the allocated buffer;
    - communicate a message to one or more destination processing modules, the message comprising at least some of the one or more rows stored in the allocated buffer;
    - otherwise:
    - execute a many-rows method to redistribute the one or more rows, wherein the many-rows method comprises:
    - communicating from the one or more transmitting processing modules a first signal to one or more processing modules within a relational database system, the first signal operable to initiate a row receiver task on each of the one or more processing modules:
    - communicating from the one or more processing modules a ready-to-receive signal to the one or more transmitting processing modules;
    - communicating from the one or more transmitting processing modules a second signal comprising the one or more rows;
    - after communication of the last row of the one or more rows, communicating from the one or more transmitting processing modules an end-of-data signal to each of the one or more processing modules.

\* \* \* \* \*